United States Patent
Minamiura

(10) Patent No.: US 8,829,857 B2
(45) Date of Patent: Sep. 9, 2014

(54) BATTERY PACK INPUT/OUTPUT CONTROL SYSTEM

(75) Inventor: Keiichi Minamiura, Toyota (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 799 days.

(21) Appl. No.: 13/125,458

(22) PCT Filed: Oct. 29, 2009

(86) PCT No.: PCT/IB2009/007258
§ 371 (c)(1),
(2), (4) Date: Apr. 21, 2011

(87) PCT Pub. No.: WO2010/049795
PCT Pub. Date: May 6, 2010

(65) Prior Publication Data
US 2011/0199053 A1 Aug. 18, 2011

(30) Foreign Application Priority Data

Oct. 30, 2008 (JP) ................................ 2008-279571

(51) Int. Cl.
*H02J 7/00* (2006.01)
*H01M 10/44* (2006.01)
*H01M 10/48* (2006.01)

(52) U.S. Cl.
CPC .............. *H01M 10/443* (2013.01); *Y02E 60/12* (2013.01); *H01M 10/441* (2013.01); *H01M 10/482* (2013.01); *H01M 10/486* (2013.01)
USPC .............................. 320/136; 320/153; 324/430

(58) Field of Classification Search
USPC ....................................................... 320/136
See application file for complete search history.

(56) References Cited

U.S. PATENT DOCUMENTS

| 7,492,129 B2 * | 2/2009 | Aridome ........................ 320/150 |
| 2007/0210746 A1 * | 9/2007 | Tanjou .......................... 320/112 |

FOREIGN PATENT DOCUMENTS

| EP | 0 909 675 A2 | 4/1999 |
| EP | 1 096 636 A2 | 5/2001 |
| EP | 1 293 377 A2 | 3/2003 |
| EP | 1 798 100 A2 | 6/2007 |
| JP | 11-111349 A | 4/1999 |
| JP | 11-187577 A | 7/1999 |
| JP | 2001-196102 A | 7/2001 |
| JP | 2006-101674 A | 4/2006 |

OTHER PUBLICATIONS

International Search Report (ISR) and Written Opinion for corresponding International Patent Application No. PCT/IB2009/007258 mailed Mar. 19, 2010.

* cited by examiner

*Primary Examiner* — Edward H Tso
*Assistant Examiner* — Johali Torres Ruiz
(74) *Attorney, Agent, or Firm* — Sughrue Mion, PLLC

(57) ABSTRACT

A controller 50 for estimating a maximum internal temperature of a battery pack 14 processes battery pack input/output limitations. The controller 50 estimates: a difference between a surface temperature and an internal temperature of the battery pack 14; a temperature difference that is dependent on different internal resistances of unit cells 12; a temperature difference that is dependent on contact states of a plurality of temperature sensors 32 with the battery pack 14; and a temperature difference that is dependent on different detection characteristics between the temperature sensors 32. The controller 50 further limits the input/output electric power of the battery pack 14 based on the estimated maximum internal temperature.

8 Claims, 9 Drawing Sheets

BATTERY PACK INPUT/OUTPUT CONTROL SYSTEM

BACKGROUND OF THE INVENTION

1. Field of the Invention

The present invention relates to a battery pack input/output control system. More particularly, the present invention relates to a battery pack input/output control system that limits the input/output of the battery pack, which is formed by combining a plurality of unit cells, based on a surface temperature of the battery pack.

2. Description of the Related Art

In order to obtain a desired high-output voltage or high-output electric power, a plurality of unit cells connect in series or in parallel, or these unit cells are combined into a single assembled battery or battery pack.

The battery produces electric power through a chemical reaction. Thus, the battery generates heat during charging and discharging. An increase in temperature of the battery can adversely affect output characteristics of the battery. Therefore, the battery temperature is monitored to limit the battery input/output. In the battery pack, there are variations between the unit cells. Also, due to the construction of the battery pack, the end and the center of the battery pack exhibit different degrees of heat dissipation, causing a temperature difference between the end and the center of the battery pack. Thus, the input/output of the battery pack is limited based on a temperature that is monitored at a plurality of locations of the battery pack.

Japanese Patent Application Publication No. 11-187577 (JP-A-11-187577) discloses a charging/discharging controller of a secondary battery. The controller predetermines an upper limit of charging/discharging electric power depending on a temperature of the battery, while predetermining an upper limit of charging/discharging electric power depending on a state of charge (SOC). The battery is provided with a plurality of temperature sensors. The controller controls charge/discharge of the battery such that the charging/discharging electric power does not exceed the upper limits.

Japanese Patent Application Publication No. 2006-101674 (JP-A-2006-101674) discloses a charging/discharging controller of a secondary battery. The controller calculates an amount of internal heat generated by multiplying the square of a current value by a battery internal resistance, thus to estimate a battery temperature based on the amount of internal heat generated. The controller otherwise uses an open circuit voltage (OCV) to estimate a battery temperature that results from chemical reaction losses at the electrode-electrolyte interface. Based on higher one of the estimated battery temperature and a measured temperature, the charging/discharging electric power is limited. The limitations on the charging/discharging electric power use the relationship between an output limiting ratio of a value between 0 and 1, and the battery temperature. As the output limiting ratio is closer to 0, the charging/discharging electric power is more severely limited.

Japanese Patent Application Publication No. 11-111349 (JP-A-11-111349) discloses a battery power supply system. A battery pack is divided into a plurality of cell blocks. Based on a voltage of the whole battery pack, a voltage of each cell block, a charging/discharging current of the whole battery pack, a temperature of an individual cell, a temperature of each cell block and the like, a battery fan is controlled to maintain the battery pack at an appropriate temperature.

Japanese Patent Application Publication No. 2001-196102 (JP-A-2001-196102) discloses an assembled battery controller. The assembled battery is formed by a plurality of cell blocks. A temperature of each cell block is corrected and an internal resistance of the cell block is calculated. Based on the detected abnormal internal resistance, whether or not the temperature increases abnormally is determined.

A plurality of unit cells are combined into a battery pack. A temperature of the battery pack is monitored using a limited number of sensors that detect a surface temperature of the battery pack. Indeed, there is a difference between the surface temperature and an internal temperature of the battery, while there are variations in internal resistance between the unit cells within the battery. In addition, there are variations in contact state of the sensors with the battery surface, and there are measured temperature errors between the sensors. As described above, in the battery pack, there are variations between the individual unit cells and variations between the individual sensors. Therefore, these variations need be directly reflected in a measured temperature of the battery pack in order to determine an actual maximum internal temperature of the battery pack.

According to the foregoing related arts, in the battery pack that is formed by combining a plurality of unit cells, a plurality of sensors are used to monitor the battery temperature, and the battery temperature is estimated based on the current, while the internal resistance of the battery is calculated to monitor if the internal resistance is abnormal. Variations between the unit cells, in other words, variations in detection result from the sensors are not directly reflected in estimating the internal temperature of the battery pack based on the measured temperature of the battery pack. Thus, the internal temperature of the battery pack is not calculated correctly enough. This can possibly prevent sufficient limitations on the input/output of the battery pack. Such insufficient limitations on the input/output of the battery pack cause the battery pack to overheat, and moreover can cause smoke, if the battery pack has smoke point characteristics, for example.

SUMMARY OF THE INVENTION

The present invention provides a battery pack input/output control system that estimates a maximum internal temperature of the battery pack in order to allow for limiting the input/output of the battery pack based on the estimated maximum internal temperature.

A first aspect of the present invention is directed to a battery pack input/output control system including: a battery pack that is formed by combining a plurality of unit cells; an ambient temperature obtaining section that obtains an ambient temperature of the battery pack; a plurality of battery temperature sensors that detect a surface temperature of the battery pack at a plurality of locations on a surface of the battery pack; a plurality of voltage detecting sections that detect voltages of some of the unit cells at a plurality of any predetermined locations of the battery pack; a current value obtaining section that obtains a current value inputted to/outputted from the battery pack; a maximum temperature estimating section that estimates a maximum internal temperature of the battery pack; and an input/output limiting section that limits the input/output of the battery pack based on the estimated maximum internal temperature. In the battery pack input/output control system, the maximum temperature estimating section includes: inside-outside temperature difference estimating means for estimating a battery inside-outside temperature difference or a difference between the internal temperature and the surface temperature of the battery pack based on the ambient temperature; and internal resistance-dependent temperature difference estimating means for estimating an internal resistance of each of the unit cells based on the current value and the voltages that are detected at the plurality of any predetermined locations, and thus for estimating an internal resistance-dependent temperature difference or a temperature difference within the battery pack, which is dependent on differences in internal resistance between the unit cells, based on the estimated internal resistance of the each unit cell, in which the maximum internal temperature of the battery pack is estimated by adding the sum of the battery inside-outside temperature difference and the internal resistance-dependent temperature difference to a maximum value of the detected surface temperature of the battery pack, the battery inside-outside temperature difference being estimated by the inside-outside temperature difference estimating means, the internal resistance-dependent temperature difference being estimated by the internal resistance-dependent temperature difference estimating means.

In accordance with the aforementioned configuration, the ambient temperature and the variations in internal resistance between the unit cells are reflected in estimating the maximum internal temperature of the battery pack, thereby to more sufficiently limit the input/output of the battery pack.

The battery pack input/output control system according to the first aspect of the present invention may further include an inside-outside temperature difference storing section that stores a relationship between the ambient temperature and a predetermined value of the battery inside-outside temperature difference, in which the inside-outside temperature difference estimating means may estimate the battery inside-outside temperature difference based on the ambient temperature by referring to the relationship stored in the inside-outside temperature difference storing section.

In accordance with the aforementioned configuration, the battery inside-outside temperature difference is obtained easily.

In the battery pack input/output control system according to the first aspect of the present invention, when a difference between the estimated internal resistance of each of the unit cells and a standard internal resistance is equal to or below a predetermined identifiable threshold, the internal resistance-dependent temperature difference estimating means may use the sum of the standard internal resistance and the internal resistance difference by the amount of the identifiable threshold as the internal resistance of the each unit cell to estimate the internal resistance-dependent temperature difference.

Normally the battery has some variations in internal resistance, and therefore calculating the internal resistances too precisely is unreasonable. In accordance with the aforementioned configuration, some material variations in internal resistance are only selected, and the other immaterial variations in internal resistance are all included in the material variations. This allows the temperature difference due to the internal resistance differences to be preset to a safe level or a larger value, thus to more sufficiently limit the input/output of the battery pack.

In the battery pack input/output control system according to the first aspect of the present invention, the maximum temperature estimating section may further include contact state-dependent temperature difference estimating means for estimating a maximum value of temperature differences between an actual surface temperature of the battery pack and values of the surface temperature, which are detected by the battery temperature sensors, the temperature differences being caused depending on contact states of the plurality of battery temperature sensors with the surface of the battery pack.

The plurality of battery temperature sensors are not always mounted to the surface of the battery pack with a uniform contact state of the sensors with the surface. In accordance with the aforementioned configuration, the maximum value of the temperature differences that are dependent on the contact states is predetermined. This allows the temperature differences, which are caused by the different contact states of the battery temperature sensors, to be preset to a safe level or a larger value, thus to sufficiently limit the input/output of the battery pack. The variations in contact state may appear as differences in degree of cooling of the battery pack due to the locations of the battery pack. Therefore, the variations in contact state may be considered as battery pack cooling variations. The battery pack cooling variations may be preset, to a safe level.

In the battery pack input/output control system according to the first aspect of the present invention, the maximum temperature estimating section may further include sensor-dependent temperature difference estimating means for estimating a detected temperature error that is dependent on different detection characteristics between the plurality of battery temperature sensors, based on the ambient temperature.

The plurality of battery temperature sensors have individual differences, and therefore obtain individually different detection values from the same temperature. Such a detected temperature error is affected by the ambient temperature. In accordance with the aforementioned configuration, the ambient temperature is reflected in estimating a temperature difference that is dependent on the variations between the battery temperature sensors. This allows for more sufficiently limiting the input/output of the battery pack.

In the battery pack input/output control system according to the first aspect of the present invention, the input/output limiting section may change an upper limit use temperature, at which the input/output limiting section starts limiting the input/output of the battery pack, depending on a comparison between the estimated maximum internal temperature and a predetermined temperature, and when the estimated maximum internal temperature is equal to or below the predetermined temperature, the battery pack may be prevented from smoking.

It is known that lithium ion or other types of batteries smoke when reaching at a temperature equal to or above the smoke point, even if the battery is activated. Users often see the smoking as an abnormality of the battery. In accordance with the aforementioned configuration, the smoke point is taken into account to limit the input/output of the battery pack. This allows for limiting the input/output of the battery pack sufficiently even for the users.

In the battery pack input/output control system according to the first aspect of the present invention, the ambient temperature may be a temperature of a medium that is incorporated in the battery pack to cool the battery pack.

A second aspect of the present invention is directed to a method of limiting input/output of a battery pack having a plurality of unit cells. The method includes: detecting voltage values of at least two of the plurality of unit cells; detecting a current value that is inputted to/outputted from the battery pack; detecting a surface temperature of the battery pack at a plurality of locations on a surface of the battery pack; calculating internal resistance values of the at least two unit cells based on the detected voltage values and the detected current value; estimating an internal temperature of each of the at least two unit cells whose internal resistance values are calculated, based on the calculated internal resistance value of the each unit cell and the surface temperature detected at the nearest one of the plurality of locations on the surface of the battery pack relative to the each unit cell; and limiting a current inputted to/outputted from the battery pack, if a maximum value of the estimated internal temperatures of the at least two unit cells exceeds a predetermined temperature.

The method of limiting input/output of a battery pack having a plurality of unit cells according to the second aspect of the present invention may further include detecting a temperature of a medium that is incorporated in the battery pack to cool the battery pack. The internal temperatures of the unit cells may be estimated based on the temperature of the medium.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

With reference to the accompanying drawings, an embodiment of the present invention will be described in details below. In the following description, a battery pack refers to a lithium ion battery pack that is formed by combining a plurality of lithium ion unit cells. Alternatively, the battery pack may be a nickel-metal hydride battery pack, for example. In the following description, the battery pack is formed by connecting a plurality of unit cells in series. However, it should be apparent that the battery pack may be formed by connecting a plurality unit cells in parallel. Alternatively, a plurality of unit cells may be connected partly in series and partly in parallel, forming a single battery pack.

The number of each type of sensor and their locations to be described below are a mere example of the present invention. It should be apparent that the number of each type of sensor to be used is not limited to the after-mentioned number, and the locations of the sensors may be arbitrarily selected. For example, in the following description, an intake temperature sensor is used to detect an ambient temperature. Alternate to the intake temperature sensor, an outside air temperature sensor or a temperature sensor that detects a temperature near the battery pack may be used.

In the following description, a power supply circuit that includes the battery pack has components, such as, a system main relay, a voltage transducer, a smoothing condenser, and an inverter. Additional component may also be included as needed. A DC/DC converter and a low voltage power supply may be examples of the additional component.

In the following description, a single unit of motor generator is used. The motor generator is connected to the power supply circuit that includes the battery pack. The motor generator functions both as a motor and as a generator. Alternatively, two units of motor generators may be used or a single unit of motor and a single unit of generator may be used.

In the following description of the drawings, like numerals are used to represent like elements, and the description thereof is not repeated. In the following description of the embodiment of the invention, some elements are represented as numerals that have been mentioned before, as needed.

Figure 1:
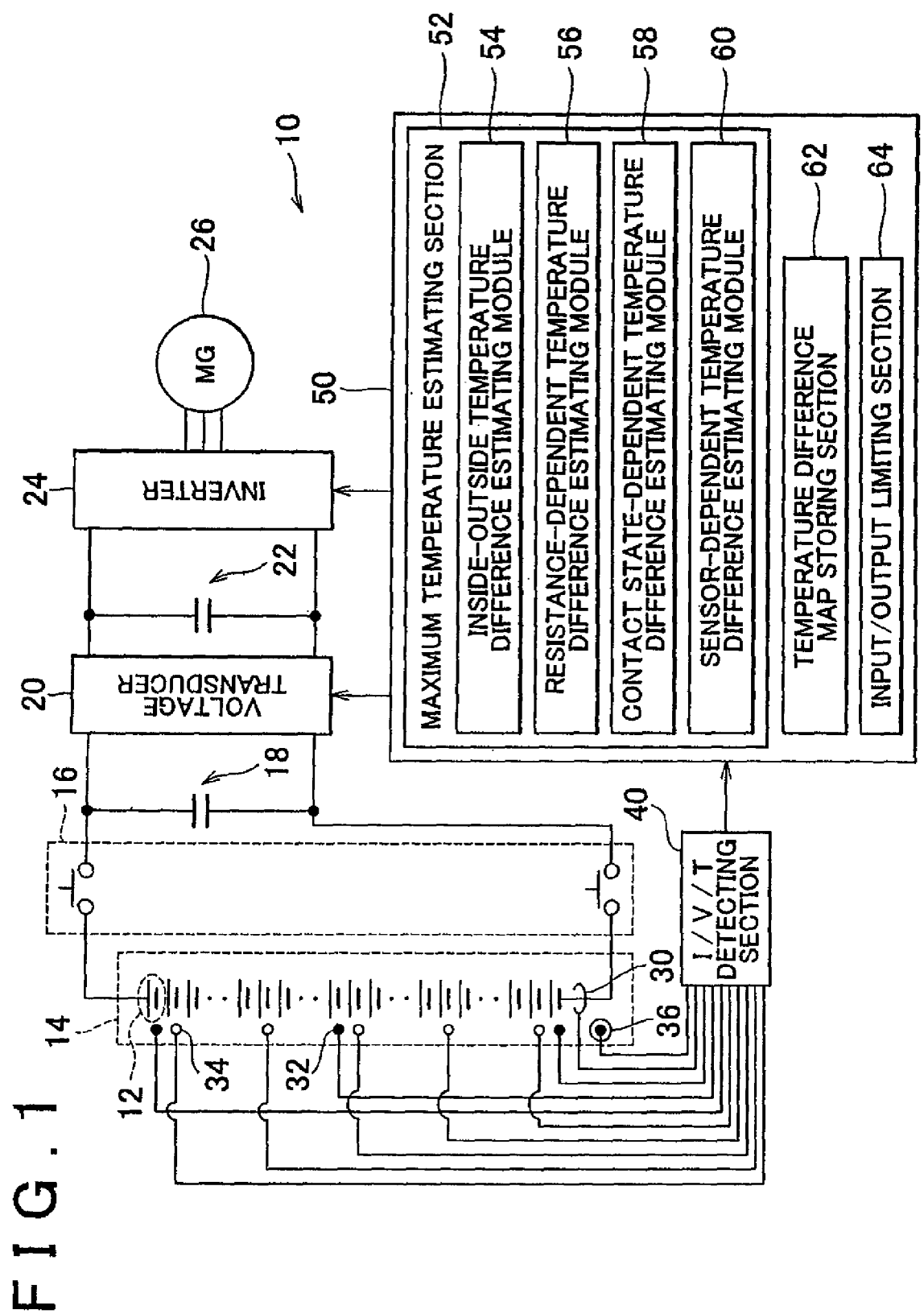
FIG. 1 illustrates a configuration of a battery pack input/output control system according to an embodiment of the present invention.

FIG. 1 illustrates a battery pack input/output control system 10 or a part of a hybrid vehicle control system that controls operation of the hybrid vehicle having a battery pack and a motor generator. The battery pack input/output control system 10 controls input/output of the battery pack. The battery pack input/output control system 10 has a function of limiting input/output of the battery pack based on a surface temperature of the battery pack. More particularly, the battery pack input/output control system 10 has functions of estimating a maximum internal temperature of the battery pack and limiting the input/output of the battery pack based the estimated maximum internal temperature.

The battery pack input/output control system 10 includes: a battery pack 14 formed by combining a plurality of unit cells 12; a system main relay 16, a battery pack-side smoothing condenser 18; a voltage transducer 20; an inverter-side smoothing condenser 22; an inverter 24; a motor generator 26; a current sensor 30 provided in association with the battery pack 14; a voltage sensor 34; a temperature sensor 32; an intake temperature sensor 36 as an ambient temperature sensor; an I/V/T detecting section 40; and a controller 50. The I/V/T detecting section 40 is connected to the above sensors to detect a current I, a voltage V, and a temperature T. The controller 50 entirely controls operations of these components. In this case, the controller 50 is equivalent to a battery pack input/output control system.

The battery pack 14 is formed by connecting a plurality of lithium ion unit cells or the unit cells 12 in series to obtain a desired output voltage and output current. The battery pack 14 is an assembled battery as a chargeable/dischargeable secondary battery. The desired output voltage may be defined as a terminal voltage of approximately 200V, for example. In this case, the battery pack 14 may be formed by connecting at least 100 pieces of the lithium ion unit cells 12 in series.

The current sensor 30 is provided in the battery pack input/output control system 10. The current sensor 30 has a function of detecting an input/output current of the battery pack 14. The current sensor 30 is connected in series with at least one of both terminals of the battery pack 14. In case where the current sensor 30 is provided on one of the terminals of the battery pack 14, a value that is detected by the current sensor 30 indicates a current value of the battery pack 14. In case where the current sensors 30 are provided on the both terminals of the battery pack 14, the I/V/T/ detecting section 40 obtains a difference between two current sensor values. If the difference exceeds a predetermined allowable difference, for example, the current sensors 30 are detected to be abnormal.

As described above, the current sensor 30 is provided in order to obtain a current value inputted to/outputted from the battery pack 14. The current sensor 30 is an example of a current value obtaining section of the present invention. The current sensor 30 is connected to the I/V/T detecting section 40. Data on the current value is transmitted to the controller 50 via the I/V/T detecting section 40. When a plurality of the current sensors 30 are used and an abnormal difference in current value between the current sensors 30 is monitored, the I/V/T detecting section 40 outputs information of the abnormal difference to implement the process of correcting the current values to determine a single correct value. Data on the single correct current value is transmitted to the controller 50.

The voltage sensor 34 is provided in the battery pack input/output control system 10. The voltage sensor 34 has a function of detecting a voltage of each of the unit cells 12 that form the battery pack 14. A plurality of the voltage sensors 34 are used. As shown by an example of FIG. 1, the five voltage sensors 34 are disposed at equal intervals along the direction of arranging the unit cells 12 that form the single battery pack 14.

Thus, the voltage sensors 34 have a function of detecting voltages of some of the unit cells 12 at a plurality of the predetermined locations of the voltage sensors 34 on the battery pack 14. The voltage sensors 34 are an example of a voltage detecting section of the present invention. The voltage sensors 34 are connected to the I/V/T detecting section 40. Data on the voltage values of some of the unit cells 12 are transmitted to the controller 50 via the I/V/T detecting section 40.

The temperature sensor 32 is provided in the battery pack input/output control system 10. The temperature sensor 32 is located on a surface of the battery pack 14, and has a function of detecting a surface temperature of the battery pack 14. A plurality of the temperature sensors 32 are used. As shown by an example of FIG. 1, the three temperature sensors 32 are disposed at equal intervals along the direction of arranging the unit cells 12 that form the single battery pack 14.

For example, the temperature sensors 32 may be thermistor or other temperature sensing devices. The temperature sensors 32 are mounted to the surface of the battery pack 14 by appropriate mounting means. The mounting means may employ an appropriate adhesive material. Alternatively, an integral molding technique may be employed. The integral molding technique is designed to mold the thermistor or other temperature sensing devices, using a resin material to be formed integrally with the battery pack 14. In the following description, the temperature sensors 32 are mounted to the battery pack 14 by the integral molding technique.

The temperature sensors 32 have a function of detecting a surface temperature of the battery pack 14. The temperature sensors 32 may be referred to as a battery surface temperature sensor or a battery temperature sensor of the present invention. The temperature sensors 32 are connected to the I/V/T detecting section 40. Data on the surface temperature of the battery pack 14 is transmitted to the controller 50 via the I/V/T detecting section 40.

The intake temperature sensor 36 has a function of detecting an ambient temperature surrounding the battery pack 14. The intake temperature sensor 36 is provided in an intake port that is designed to cool the battery pack 14. The intake temperature sensor 36 detects an intake temperature or a temperature of air that is introduced into the battery pack 14 to cool the battery pack 14. Thus, the intake temperature sensor 36 has a function of obtaining an ambient temperature of the battery pack 14. The intake temperature sensor 36 is an example of an ambient temperature obtaining section of the present invention. A plurality of the intake temperature sensors 36 may be provided in the intake port. Alternatively, in addition to the intake temperature sensor 36, another sensor may be provided as ambient temperature detecting means. In these cases, values that are detected by the respective sensors may be averaged, and the result of the averaged value may be determined as an ambient temperature of the battery pack 14.

The I/V/T detecting section 40 is an interface circuit that is provided between the several types of sensors and the controller 50. One example of values that are detected by the several types of sensors is an analog voltage value. The I/V/T detecting section 40 has a function of converting different analog signal levels of the sensors into a normalized analog signal or a digital signal so as to suit the respective process steps in the controller 50.

The system main relay 16 is a power supply switch that electrically connects or disconnects between the battery pack 14 or a high-voltage secondary battery and a load side that includes the motor generator 26. The system main relay 16 uses a plurality of relays. The relays are provided independently on a positive pole bus and a negative pole bus, in order to prevent the terminals in the respective relays from being welded to each other due to arc discharge or the like that is caused by high-voltage connection or disconnection. These relays connect or disconnect between the battery pack 14 and the load side at their respective predetermined timings that are appropriately different from each other. This prevents the terminals in the respective relays from being welded to each other.

The voltage transducer 20 is located between the battery pack 14 and the inverter 24, and has a function of transducing a voltage. The voltage transducer 20 may include a reactor and a switching element. The switching element is activated under the control of the controller 50. The function of transducing a voltage includes a voltage boosting function and a voltage reducing function. The voltage boosting function is designed to boost a voltage on the battery pack side by an energy storage effect of the reactor, thus to supply the boosted voltage to the inverter side. The voltage reducing function is designed to reduce a voltage on the inverter side, thus to supply the reduced voltage to the battery pack side as a charging voltage.

The battery pack-side smoothing condenser 18 is provided between the battery pack 14 and the voltage transducer 20. The inverter-side smoothing condenser 22 is provided between the voltage transducer 20 and the inverter 24. These condensers 18 and 22 have a function of reducing variations in voltage and in current to smooth the voltages and the currents.

The inverter 24 is a circuit to convert between alternating current (AC) and direct current (DC). The inverter 24 includes a plurality of switching elements that are activated under the control of the controller 50. The inverter 24 is designed both for AC to DC conversion and for DC to AC conversion. When the motor generator 26 functions as a generator, the inverter 24 has an AC to DC conversion function. This function is designed to convert three-phase regenerative AC power from the motor generator 26 to DC power, thus to supply the DC power to the battery pack side as a charging current. When the motor generator 26 functions as a motor, the inverter 24 has a DC to AC conversion function during vehicle acceleration, while having the AC to DC conversion function during vehicle braking. The DC to AC conversion function is designed to convert DC power from the battery pack side to three-phase AC driving power, thus to supply the three-phase AC driving power to the motor generator 26 as driving power. In contrast, the AC to DC conversion function is designed to convert three-phase regenerative AC power from the motor generator 26 to DC power, thus to supply the DC power to the battery pack side as a charging current.

The battery pack 14, the system main relay 16, the battery pack-side smoothing condenser 18, the voltage transducer 20, the inverter-side smoothing condenser 22, and the inverter 24 are connected to the motor generator 26, forming a single power supply circuit.

The motor generator 26 is a three-phase synchronized motor generator (MG) that is mounted to the vehicle. The motor generator 26 functions as a motor when electric power is supplied from the power supply circuit that includes the battery pack 14 to the motor generator 26. The motor generator 26 otherwise functions as a generator during vehicle engine (not shown) operation or during vehicle braking.

The controller 50 has a function of wholly controlling operations of the respective components of the battery pack input/output control system 10. More particularly, the controller 50 has functions of estimating a maximum internal temperature of the battery pack, controlling operations of the voltage transducer 20 and the inverter 24 based on the estimated maximum internal temperature, and thereby limiting input/output electric power of the battery pack 14. This controller 50 may be a vehicle-mounted computer or other suitable device.

The controller 50 includes: a maximum temperature estimating section 52; a temperature difference map storing section 62; and an input/output limiting section 64. The maximum temperature estimating section 52 is designed to estimate a maximum internal temperature of the battery pack 14. The temperature difference map storing section 62 is designed to store a temperature difference map to be used by the maximum temperature estimating section 52. The input/output limiting section 64 is designed to limit the input/output electric power of the battery pack 14 based on the estimated maximum internal temperature.

The maximum temperature estimating section 52 includes: an inside-outside temperature difference estimating module 54; a resistance-dependent temperature difference estimating module 56; a contact state-dependent temperature difference estimating module 58; and a sensor-dependent temperature difference estimating module 60. The inside-outside temperature difference estimating module 54 is designed to estimate an inside-outside temperature difference, more specifically, a difference between a surface temperature and an internal temperature of the battery pack 14. The resistance-dependent temperature difference estimating module 56 is designed to estimate a temperature difference within the battery pack, which is dependent on different internal resistances of the unit cells 12. The contact state-dependent temperature difference estimating module 58 is designed to estimate a temperature difference that is dependent on contact states of the temperature sensors 32 with the battery pack 14. The sensor-dependent temperature difference estimating module 60 is designed to estimate a temperature difference that is dependent on different detection characteristics between the temperature sensors 32.

The aforementioned functions are achieved by software. More specifically, the aforementioned functions are achieved by implementing a battery pack input/output control program. Part of these functions may be achieved by hardware.

Figure 2:
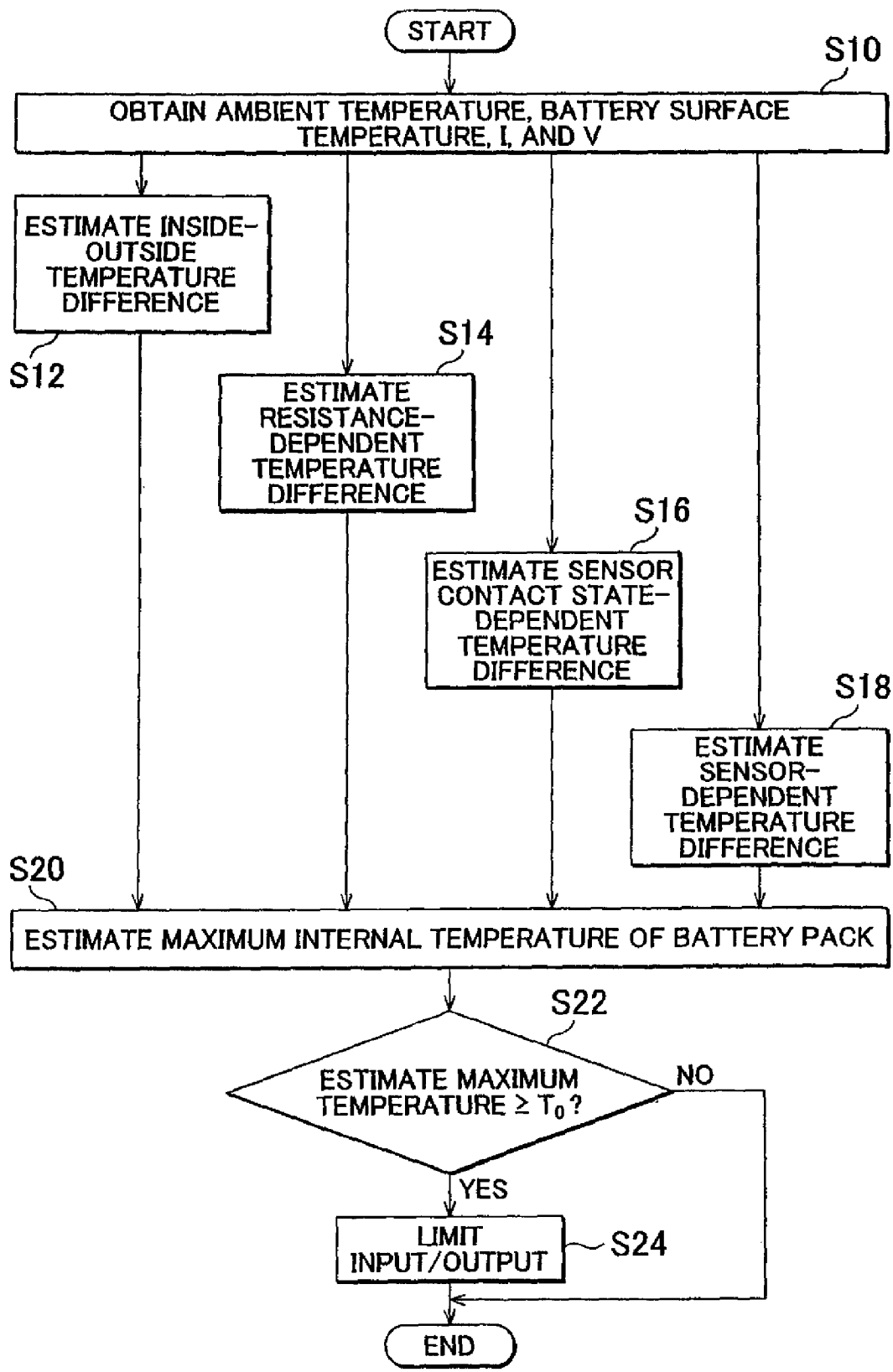
FIG. 2 is a flowchart illustrating a procedure for limiting input/output of the battery pack based on an estimated maximum internal temperature of the battery pack according to the embodiment of the present invention.

With reference to FIG. 2 to FIG. 11, operation of the controller 50 thus configured, more particularly, the functions of the controller 50 will be detailed below. FIG. 2 is a flowchart illustrating a procedure for limiting the input/output of the battery pack 14 based on the estimated maximum internal temperature of the battery pack 14. FIGS. 3 to FIG. 7 illustrate the respective functions of the maximum temperature estimating section 52 in the controller 50. FIG. 8 to FIG. 11 illustrate how the input/output of the batterypack 14 is limited.

As mentioned above, FIG. 2 is the flowchart illustrating the procedure for limiting the input/output of the battery pack 14 based on the estimated maximum internal temperature of the battery pack 14. Each procedure step corresponds to each step of the battery pack input/output control program. In order to limit the input/output of the battery pack 14, the ambient temperature, the battery surface temperature, the current I, and the voltage V are first obtained (step S10). To be more specific, the ambient temperature is obtained by the intake temperature sensor 36; the battery surface temperature is obtained by the temperature sensors 32; the current value is obtained by the current sensor 30; and the voltages of some of the unit cells are obtained by the voltage sensors 34.

Then, four temperature differences are estimated. That is, an inside-outside temperature difference is estimated (step S12); a resistance-dependent temperature difference is estimated (step S14); a sensor contact state-dependent temperature difference is estimated (step S16); and a sensor-dependent temperature difference is estimated (step S18). With reference to FIG. 3 to FIG. 7, these estimations will be described below.

The step of estimating an inside-outside temperature difference (S12) is designed to estimate a battery inside-outside temperature difference or a difference between the internal temperature and the surface temperature of the battery pack 14 based on the ambient temperature. The surface temperature is actually detected by the temperature sensors 32. This step is implemented by the function of the inside-outside temperature difference estimating module 54 of the maximum temperature estimating section 52 in the controller 50.

To be more specific, a difference between the surface temperature of the battery pack 14, which is actually detected by the temperature sensors 32, and the internal temperature of the battery pack 14 is estimated by taking the ambient temperature that is obtained by the intake temperature sensor 36 into account. This estimation thus uses a map shown in FIG. 3. The map shows the relationship between the ambient temperature and the inside-outside temperature difference. The map is plotted with experimentally determined data. The horizontal axis represents the ambient temperature. The vertical axis represents the inside-outside temperature difference with the surface temperature of the battery pack 14 used as the reference. The inside-outside temperature difference is obtained by subtracting the surface temperature of the battery pack 14, which is measured by the temperature sensors 32, from the internal temperature of the battery pack 14.

The inside-outside temperature difference has characteristics of increasing as the ambient temperature decreases from a room temperature (RT). Such characteristics are defined by the structure of the battery pack 14, and therefore, the map that shows the relationship between the ambient temperature and the inside-outside temperature difference is obtained beforehand. The map obtained is stored in the temperature difference map storing section 62 in the controller 50. Thus, in order to estimate the inside-outside temperature difference, the ambient temperature is used as a search key to search the map that shows the relationship between the ambient temperature and the inside-outside temperature difference, thus to read out the corresponding inside-outside temperature difference.

Other than the map that shows the relationship between the ambient temperature and the inside-outside temperature difference, any data form may be employed as long as the data correlates the ambient temperature with the inside-outside temperature difference. For example, a form of lookup table may be employed in which the relationship between the ambient temperature and the inside-outside temperature difference is defined. Alternatively, a form of function may be employed in which the function with an input of the ambient temperature produces an output of the inside-outside temperature difference.

The step of estimating a resistance-dependent temperature difference (S14) is designed to estimate an internal resistance R of each of the unit cells 12 from the current value I and the voltage values V that are detected at a plurality of the locations of the voltage sensors 34, thus to estimate a temperature difference within the battery pack 14, which is dependent on differences in internal resistance R between the unit cells 12. This step is implemented by the function of the resistance-dependent temperature difference estimating module 56 of the maximum temperature estimating section 52.

Figure 4:
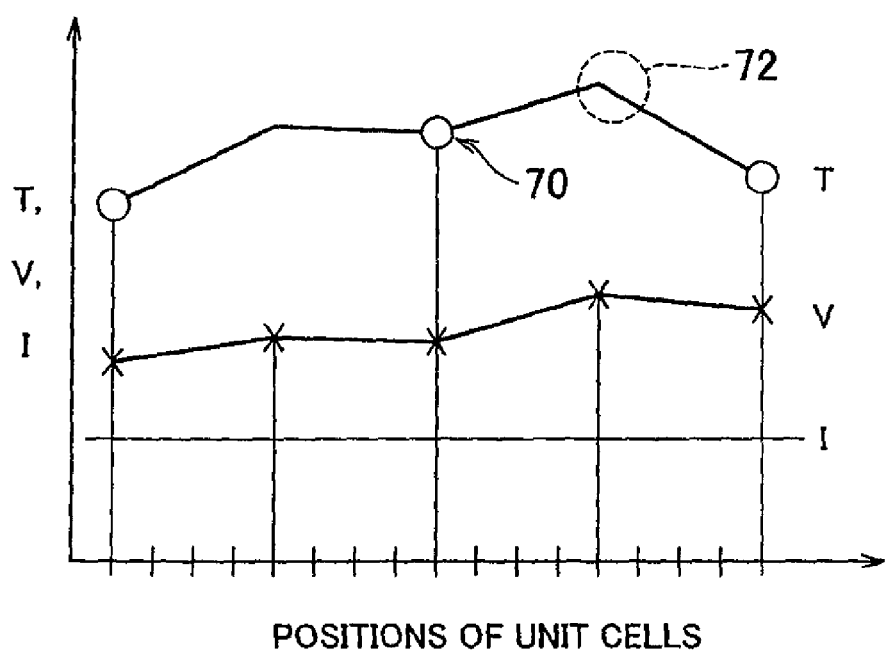
FIG. 4 illustrates how a resistance-dependent temperature difference is estimated according to the embodiment of the present invention.

FIG. 4 illustrates how the resistance-dependent temperature difference is estimated. In FIG. 4, the horizontal axis represents the positions of the unit cells 12 in the battery pack 14. Also, the vertical axis represents the current value I, the voltage values V of the unit cells 12, and the surface temperature T of the battery pack 14 in order from bottom to top of FIG. 4.

The battery pack 14 has one measurement of the current I. Some of the unit cells 12, to which the voltage sensors 34 are disposed, have own measurement data on their respective voltage values V. FIG. 4 shows data on the five voltage values V, as an example. In FIG. 4, the voltage values V of the other of the unit cells 12 at intermediate points between the five measurement data points are estimated by interpolation. FIG. 4 shows the voltage values V of all the unit cells 12 by connecting the five measurement data points with straight lines. In this manner, the voltage value V and the current value I of each of the unit cells 12 are determined, and are thus inputted to the equation R=V/I, thereby to calculate the internal resistance R of each of the unit cells 12.

Naturally, there are significant variations in internal resistance R between the unit cells 12. Assuming that the values of the internal resistance R thus calculated are directly used for estimating an amount of heat generated, the estimated amount of heat generated can be smaller than the actual amount of heat generated. Therefore, in order to preset the temperature difference that is dependent on the internal resistances R to a safe level, the calculated internal resistance value of each of the unit cells 12 is compared to a standard internal resistance value. If a difference between the calculated value and the standard value is equal to or below a predetermined identifiable threshold, the each unit cell is considered to have an internal resistance that is different from the standard internal resistance value by the amount of the identifiable threshold.

That is, the internal resistance value of the each unit cell is estimated to be equal to the sum of the standard internal resistance value and the internal resistance difference by the amount of the identifiable threshold. Thereby, even when the calculated internal resistance value can be smaller than the actual internal resistance, the internal resistance difference between the calculated value and the standard value is increased to the predetermined identifiable threshold. This allows the temperature difference that is dependent on the internal resistances R to be preset to a safe level, that is, to a larger value.

An increase in battery temperature, which is dependent on the internal resistances R, is estimated based on the product of the current value I and each of the voltage values V. The current value I is constant according to the embodiment of the present invention. It is thus assumed that the increase in battery temperature, which is dependent on the internal resistances R, shows substantially the same distribution pattern as the voltage values V. FIG. 4 shows three measurement points of the temperature sensors 32. Temperatures at intermediate points between the three measurement points are determined by directly interpolating the distribution of the battery temperature that is dependent on the internal resistances R. In the example of FIG. 4, the intermediate points between the three measurement points of the temperature sensors 32 are interpolated according to the distribution pattern of the voltage values V. The example shows estimated temperatures of the unit cells 12, which are dependent on the respective internal resistances R.

As shown in FIG. 4, a maximum value 72 of the estimated temperatures of the unit cells, which are dependent on the respective internal resistances R, is higher than a maximum value 70 of the three measurements that are detected by the temperature sensors 32. A difference between the estimated maximum value 72 and the measured maximum value 70 corresponds to the temperature difference that is dependent on the internal resistances R. In this manner, the temperature difference that is dependent on the internal resistances R is estimated.

The step of estimating a sensor contact state-dependent temperature difference (S16) is designed to estimate in advance a maximum value of temperature differences between the actual surface temperature of the battery pack 14 and values of the temperature, which are detected by the temperature sensors 32. These temperature differences are dependent on the contact states of a plurality of the temperature sensors 32 with the surface of the battery pack 14. This step is implemented by the function of the contact state-dependent temperature difference estimating module 58 of the maximum temperature estimating section 52.

Figure 5:
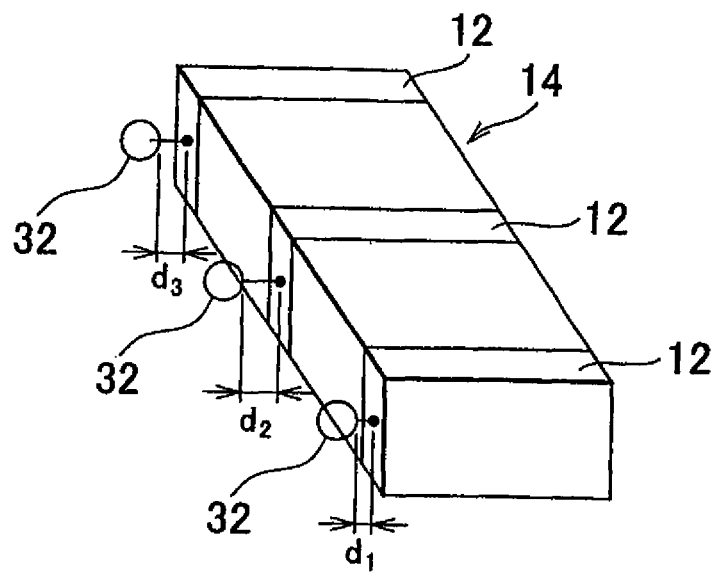
FIG. 5 schematically shows a contact state of a plurality of temperature sensors with a surface of the battery pack according to the embodiment of the present invention.

FIG. 5 schematically shows the contact state of a plurality of the temperature sensors 32 with the surface of the battery pack 14. As shown in FIG. 5, the three temperature sensors 32 are mounted to the battery pack 14 with respective clearances $d_1$, $d_2$, and $d_3$ therebetween. The clearances may be essentially unnecessary. However, there are indeed some clearances. These clearances cause differences between the temperature values that are detected by the temperature sensors 32 and the actual internal temperature of the battery pack 14. Although there are actually wide variations in temperature differences that are caused by the clearances, the temperature differences are estimated within a certain range of values. In such a case, the temperature differences that are dependent on the aforementioned contact states may be estimated at a safe value, that is, a relatively larger value, from the viewpoint of limiting the input/output of the battery pack 14. For example, the temperature differences may be estimated at a preset constant safe value. Although the estimation of the temperature differences depends on how the temperature sensors 32 are mounted to the battery pack 14, a temperature difference that falls within an appropriate range of 10° C. to 20° C. may be estimated as a sensor contact state-dependent temperature difference.

The variations in clearances or contact states between the battery pack 14 and the temperature sensors 32 may be considered to appear as differences in degree of cooling of some of the unit cells 12 at which the temperature sensors 32 are located on the battery pack 14.

The step of estimating a sensor-dependent temperature difference (S18) is designed to estimate a detected temperature error that is dependent on the different detection characteristics between a plurality of the temperature sensors 32 based on the ambient temperature. This step is implemented by the function of the sensor-dependent temperature difference estimating module 60 of the maximum temperature estimating section 52.

Figure 6:
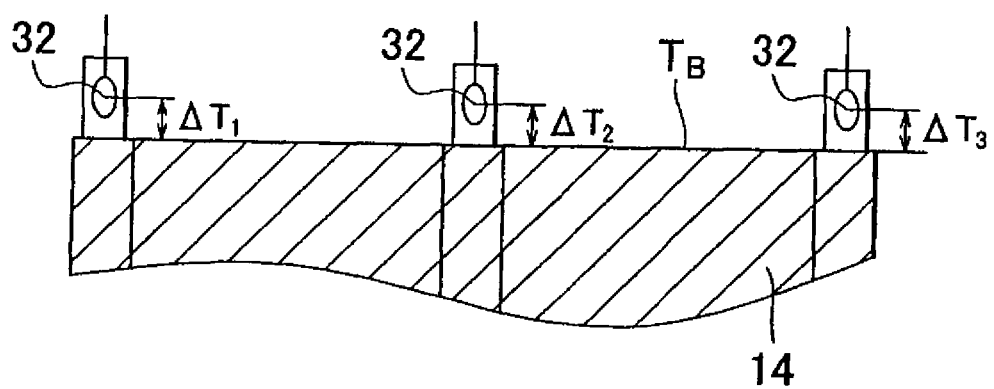
FIG. 6 shows a mounting state of three temperature sensors on the battery pack according to the embodiment of the present invention.

FIG. 6 shows a mounting state of the three temperature sensors 32 on the battery pack 14. In FIG. 6, a surface temperature $T_B$ of the battery pack 14 is constant, and the respective clearances between the three temperature sensors 32 and the battery pack 14 are equal to each other. Despite that, the values that are detected by the three temperature sensors 32 can be all different from the surface temperature $T_B$. An example of FIG. 6 represents deviations of the temperature values that are detected by the three temperature sensors 32 from $T_B$ as $\Delta T_1$, $\Delta T_2$, and $\Delta T_3$, respectively. As described above, the three temperature sensors 32 detect different temperature values from each other due to the different detection characteristics between the sensors 32. The different detection characteristics include not only different temperature sensing characteristics between the respective temperature sensors 32, but also different conditions that are caused by the integral resin molding, such as a different positional relationship between the resin-molded temperature sensing devices.

Figure 3:
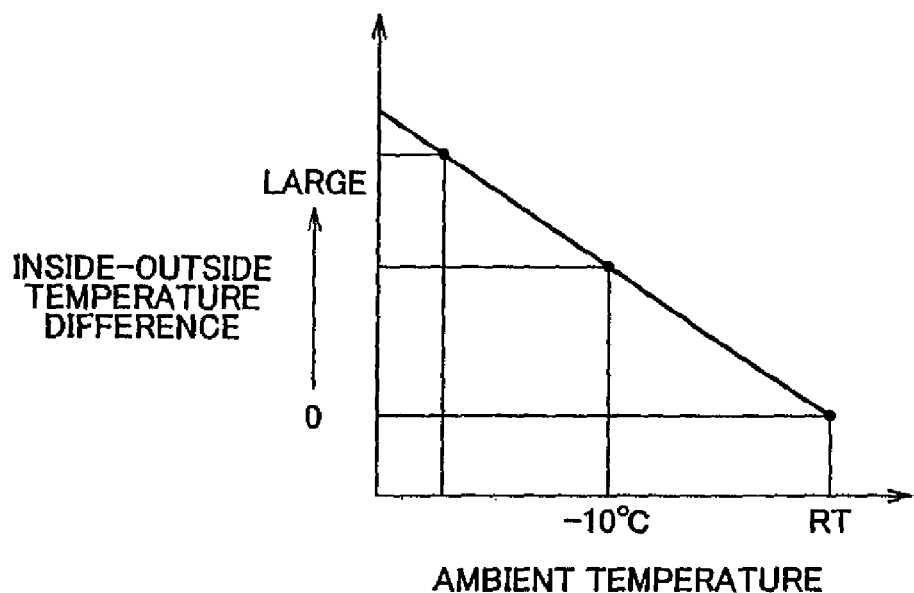
FIG. 3 is a map showing the relationship between an ambient temperature and an inside-outside temperature difference according to the embodiment of the present invention.
Figure 7:
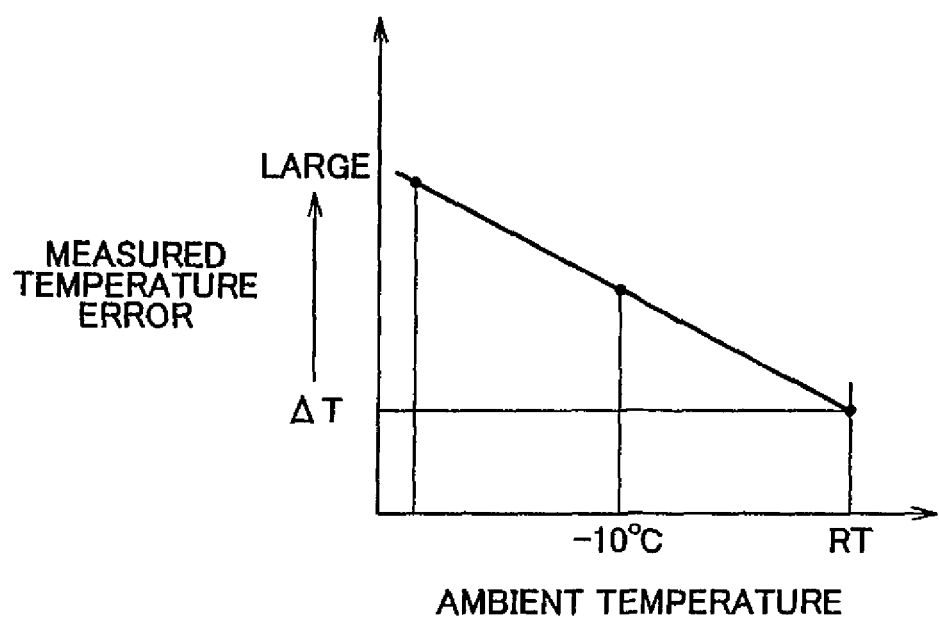
FIG. 7 is a map showing the relationship between an ambient temperature and a measured temperature error according to the embodiment of the present invention.

FIG. 7 shows that the sensor-dependent temperature difference also increases as the ambient temperature decreases, as in the case of the inside-outside temperature difference that is described with reference to FIG. 3. In FIG. 7, the horizontal axis represents the ambient temperature, while the vertical axis represents a measured temperature error or a difference in detected temperature value between the temperature sensors. Data on the relationship between the ambient temperature and the measured temperature error is empirically obtained in advance, and is plotted in a map. The map that shows the relationship between the ambient temperature and the measured temperature error is stored in the temperature difference map storing section 62 in the controller 50, as in the case with the map described with reference to FIG. 3.

Thus, in order to estimate the sensor-dependent temperature difference, the ambient temperature is used as a search key to search the map that shows the relationship between the ambient temperature and the measured temperature error, thus to read out the corresponding measured temperature error as the sensor-dependent temperature difference. Other than the map that shows the relationship between the ambient temperature and the measured temperature error, any data form may be employed, as long as the data correlates the ambient temperature with the measured temperature error. For example, a form of lookup table may be employed in which the relationship between the ambient temperature and the measured temperature error is defined. Alternatively, a form of function may be employed in which the function with an input of the ambient temperature produces an output of the measured temperature error.

Returning to FIG. 2, when the four steps of estimating the temperature differences are completed, the maximum internal temperature of the battery pack 14 is estimated (step S20). Then, whether or not the estimated maximum internal temperature is equal to or above a predetermined threshold temperature is determined (step S22). Preferably the threshold temperature is a smoke point $T_0$ that is a characteristic of lithium ion batteries. If the maximum internal temperature is below the smoke point $T_0$, lithium ion batteries are prevented from smoking. If the battery pack 14 is not a lithium ion battery, a threshold temperature $T_0$ is predetermined in accordance with characteristics of the battery type used. Then, if the determination in the step S22 is affirmative, the input/output electric power of the battery pack 14 is limited to prevent the battery pack 14 from smoking (step S24). When the step S24 is implemented or if the determination in the step S22 is negative, a series of the steps to control the battery pack input/output end.

Figure 8:
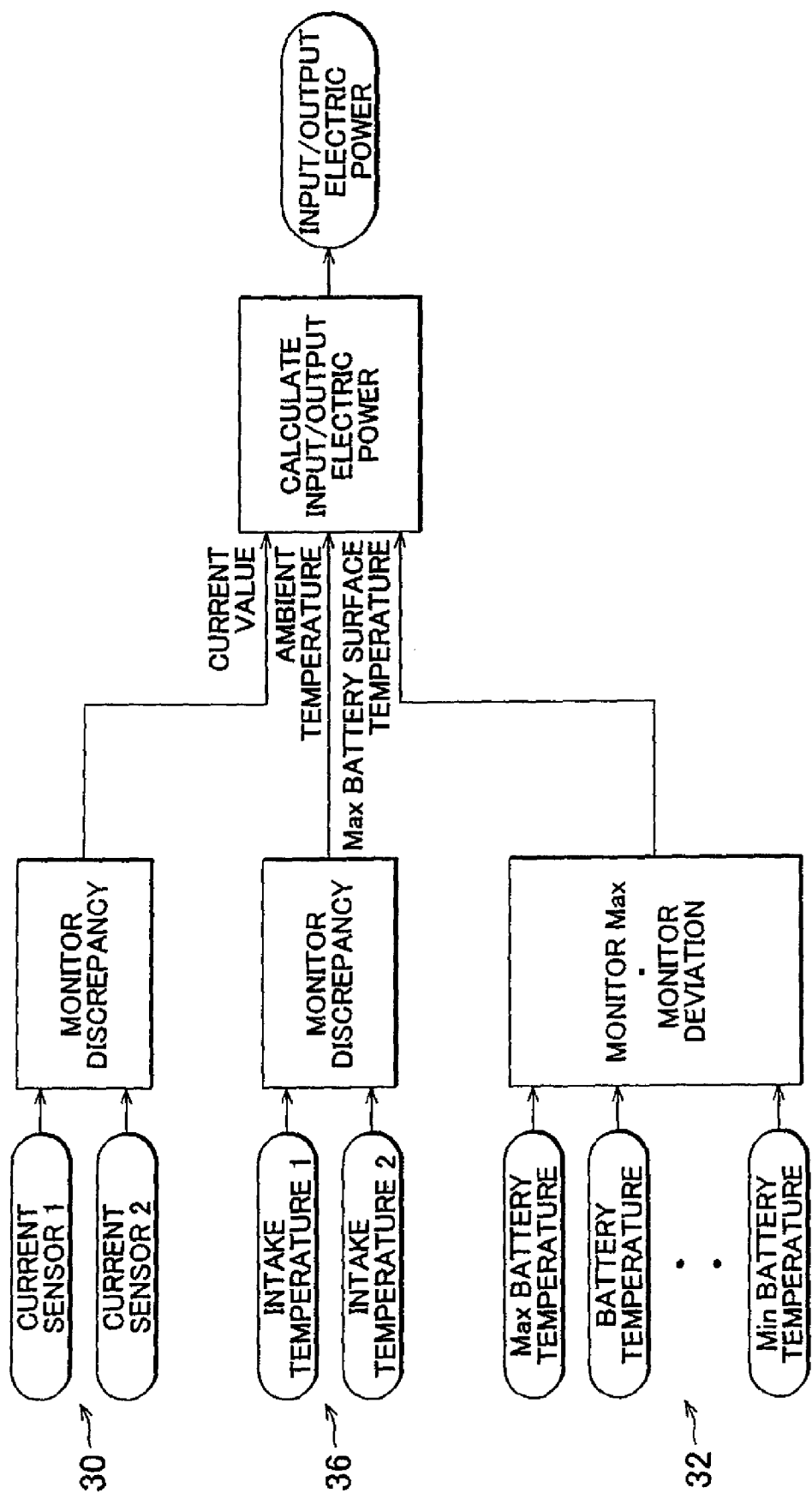
FIG. 8 illustrates the process flow of controlling the input/output of the battery pack according to the embodiment of the present invention.

FIG. 8 illustrates a flow of the series of the steps to control the battery pack input/output. In FIG. 8, a discrepancy between current values that are detected by a plurality of the current sensors 30 is monitored, and then a single current value is determined. In addition, a discrepancy between ambient temperature values that are detected by a plurality of the intake temperature sensors 36 is monitored, and then the ambient temperature is determined by averaging the values or other suitable processing. Furthermore, values of the battery surface temperature, which are detected by a plurality of the temperature sensors 32, are arranged from the maximum to the minimum, and the maximum battery surface temperature and the deviations of the battery surface temperature values from $T_B$ are monitored, and then the maximum battery surface temperature is determined.

Then, the input/output electric power of the battery pack 14 is calculated based on the current value, the ambient temperature, and the maximum battery surface temperature. According to this calculation, the input/output electric power is limited.

Figure 9:
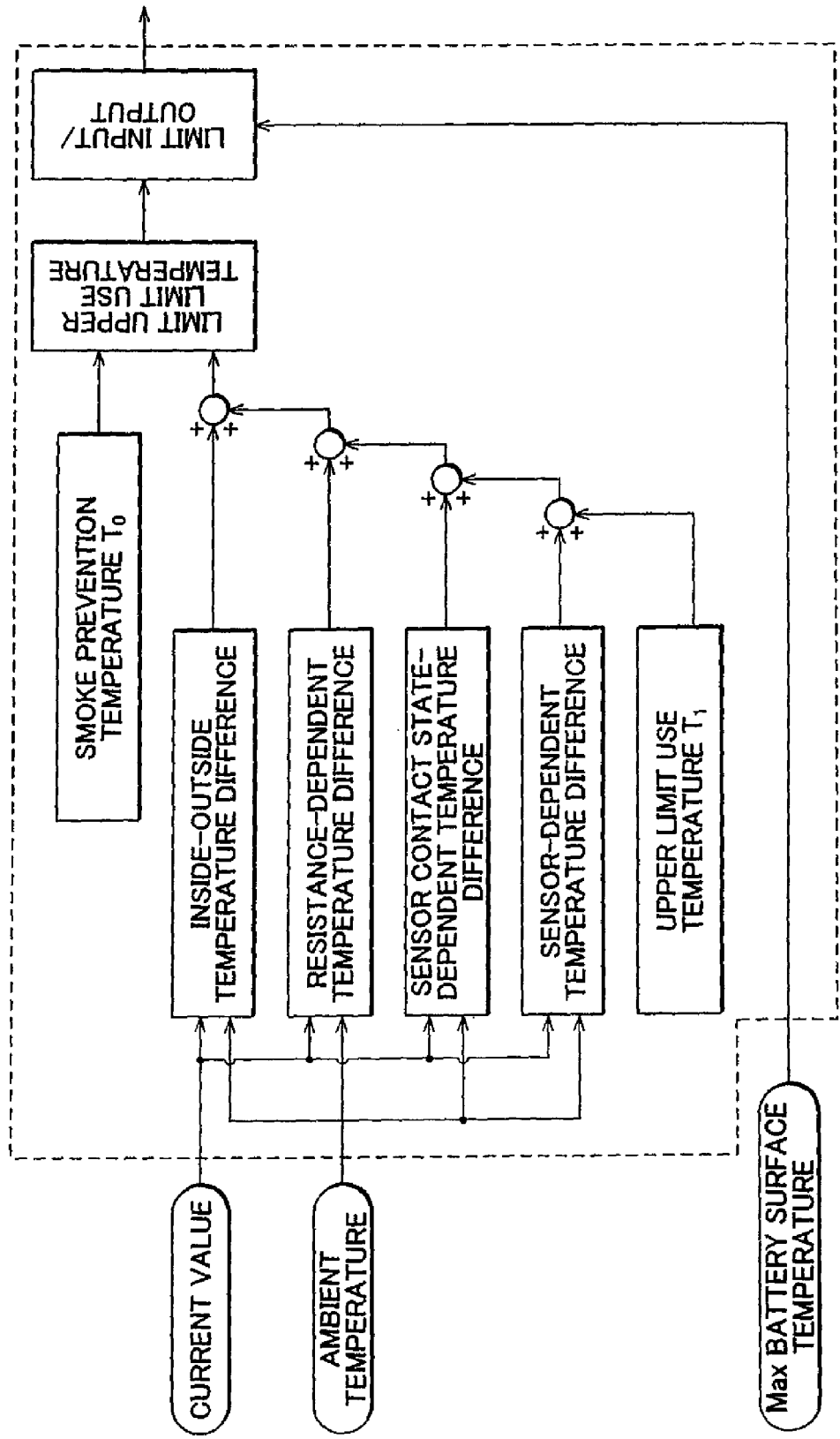
FIG. 9 illustrates the detailed flow of calculating input/output electric power according to the embodiment of the present invention.

FIG. 9 illustrates the detailed flow of calculating the input/output electric power of the battery pack 14. As shown in FIG. 9, the resistance-dependent temperature difference is calculated based on the current value and the ambient temperature, while the inside-outside temperature difference is calculated based on the ambient temperature. Then, the resistance-dependent temperature difference, the inside-outside temperature difference, the sensor contact state-dependent temperature difference, and the sensor-dependent temperature difference are added to an upper limit use temperature $T_1$ of the battery pack 14, thus to estimate the maximum internal temperature of the battery pack 14. Then, the estimated maximum internal temperature is compared to the smoke point $T_0$ or a critical temperature to prevent lithium ion batteries from smoking. According to the comparison result, the upper limit use temperature is limited. Based on the limitations on the upper limit use temperature, the input/output electric power of the battery pack 14 is limited.

Figure 10:
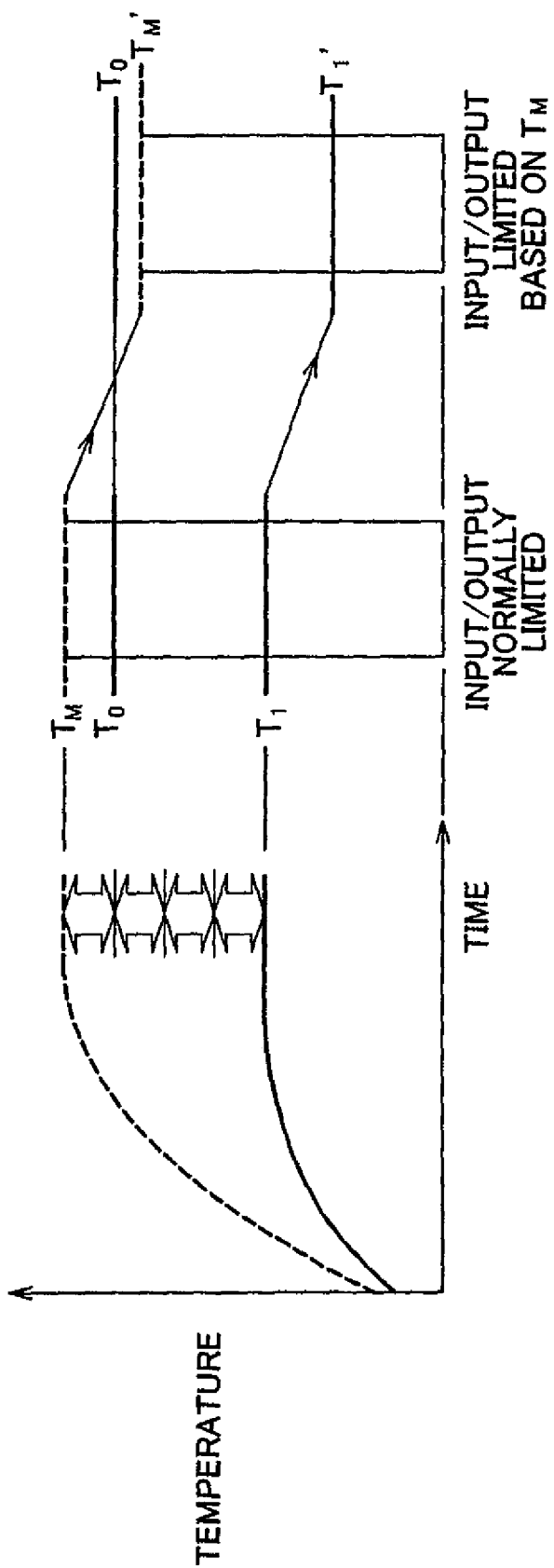
FIG. 10 shows how the maximum internal temperature of the battery pack is estimated and how the input/output of the battery pack is limited based on the estimated maximum internal temperature from the viewpoint of the makeup of the temperature according to the embodiment of the present invention.

FIG. 10 shows how the maximum internal temperature of the battery pack 14 is estimated and how the input/output of the battery pack 14 is limited based on the estimated maximum internal temperature from the viewpoint of the makeup of the temperature. The leftmost chart in FIG. 10 shows how the estimated maximum internal temperature of the battery pack 14 is determined. In this chart, the horizontal axis represents the time, while the vertical axis represents the temperature. The solid line shows the maximum battery surface temperature that is measured by the temperature sensors 32. The broken line shows the estimated maximum internal temperature of the battery pack 14. There are four hollow white arrows between the solid line and the broken line. These arrows indicate the four estimated temperature differences that are described in FIG. 3 to FIG. 7.

To be more specific, the estimated maximum internal temperature of the battery pack 14 is obtained by adding the inside-outside temperature difference, the resistance-dependent temperature difference, the sensor contact state-dependent temperature difference, and the sensor-dependent temperature difference to the measured maximum battery surface temperature.

Two bar graphs on the right in FIG. 10 show the relationship between the upper limit use temperature $T_1$ of the battery pack 14 and the smoke point $T_0$ where the estimated maximum internal temperature of the battery pack 14 is represented as $T_M$. The upper limit use temperature $T_1$ of the battery pack 14 is determined based on the battery surface temperature that is detected by the temperature sensors 32. In other words, the input/output electric power of the battery pack 14 is normally limited in such a manner that the values that are detected by the temperature sensors 32 do not exceed the upper limit use temperature $T_1$.

One of the bar graphs on the right in FIG. 10 shows a comparative example. In the comparative example, the battery surface temperature is controlled at the upper limit use temperature $T_1$ by normally implementing the input/output limitation process. This example shows that the estimated maximum internal temperature $T_M$ of the battery pack 14 exceeds the smoke point $T_0$, although the input/output limitation process is normally implemented. This causes lithium ion batteries to smoke.

Thus, the input/output of the battery pack 14 is limited based on the estimated maximum internal temperature $T_M$ of the battery pack 14 according to the embodiment of the present invention. The other one of the bar graphs on the right in FIG. 10 shows the case of limiting the input/output of the battery pack 14 based on $T_M$. In this graph, the estimated maximum internal temperature $T_M$ of the battery pack 14 is compared to the smoke point $T_0$. Then, the upper limit use temperature $T_1$ is decreased to $T_1'$ such that $T_M$ does not exceed $T_0$. Accordingly, the estimated maximum internal temperature $T_M$ of the battery pack 14 is decreased, by the amount of the decrease in upper limit temperature, to $T_M'$. In this manner, the input/output of the battery pack 14 is limited based on the estimated maximum internal temperature of the battery pack 14, thus to prevent lithium ion batteries from smoking.

Figure 11:
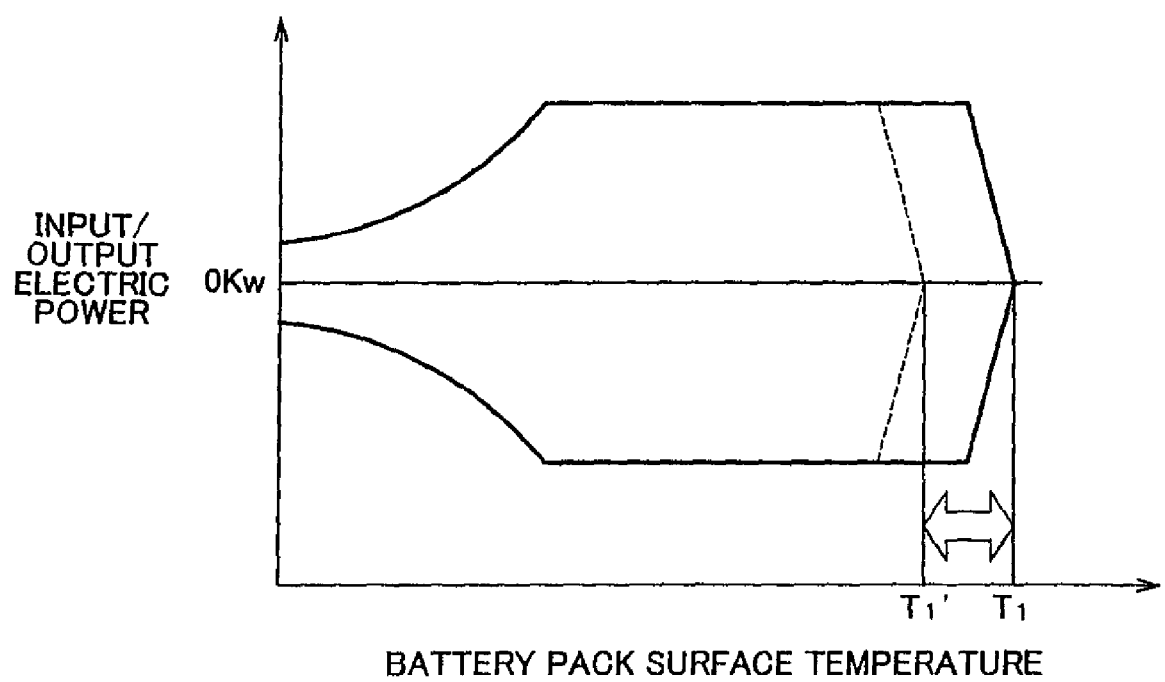
FIG. 11 shows how the input/output of the battery pack is limited based on the battery surface temperature and how the input/output of the battery pack is limited based on the estimated maximum internal temperature of the battery pack, using a battery pack input/output electric power characteristic chart.

FIG. 11 shows how the input/output of the battery pack 14 is limited based on the battery surface temperature and how the input/output of the battery pack 14 is limited based on the estimated maximum internal temperature of the battery pack 14, using an input/output electric power characteristic chart for the battery pack 14. In FIG. 11, the horizontal axis represents the surface temperature of the battery pack 14, while the vertical axis represents the input/output electric power or charging/discharging electric power of the battery pack 14. As described above, when the input/output of the battery pack 14 is limited based on the battery surface temperature, the surface temperature of the battery pack 14 is equal to or below the upper limit use temperature $T_1$.

In contrast, when the input/output of the battery pack 14 is limited based on the estimated maximum internal temperature of the battery pack 14, if the estimated maximum internal temperature $T_M$ is equal to or above the smoke point $T_0$, the surface temperature of the battery pack 14 is decreased to $T_1'$, such that the estimated maximum internal temperature $T_M'$ does not exceed the smoke point $T_0$, as described in FIG. 10. In this manner, the input/output of the battery pack 14 is limited based on the estimated maximum internal temperature of the battery pack 14, thus to prevent lithium ion batteries from smoking.

The present invention is applicable to a method for limiting input/output of a battery pack having a plurality of unit cells. The method includes: detecting voltage values of at least two of the plurality of unit cells; detecting a current value that is inputted to/outputted from the battery pack; detecting a surface temperature of the battery pack at a plurality of locations on a surface of the battery pack; calculating internal resistance values of the at least two unit cells based on the detected voltage values and the detected current value; estimating an internal temperature of each of the at least two unit cells whose internal resistance values are calculated, based on the calculated internal resistance value of the each unit cell and the surface temperature detected at the nearest one of the plurality of locations on the surface of the battery pack relative to the each unit cell; and limiting a current inputted to/outputted from the battery pack, if a maximum of the estimated internal temperatures of the at least two unit cells exceeds a predetermined temperature. The method of limiting input/output of a battery pack having a plurality of unit cells may further include detecting a temperature of a medium that is incorporated in the battery pack to cool the battery pack. The internal temperatures of the unit cells may be estimated based on the temperature of the medium.

While some embodiments of the invention have been illustrated above, it is to be understood that the invention is not limited to details of the illustrated embodiments, but may be embodied with various changes, modifications or improvements, which may occur to those skilled in the art, without departing from the scope of the invention.

The invention claimed is:

1. A battery pack input/output control system comprising:
    a battery pack that is formed by combining a plurality of unit cells;
    an ambient temperature obtaining section that obtains an ambient temperature of the battery pack;
    a plurality of battery temperature sensors that detect a surface temperature of the battery pack at a plurality of locations on a surface of the battery pack;
    a plurality of voltage detecting sections that detect voltages of some of the unit cells at a plurality of any predetermined locations of the battery pack;
    a current value obtaining section that obtains a current value inputted to/outputted from the battery pack;
    a maximum temperature estimating section that estimates a maximum internal temperature of the battery pack; and
    an input/output limiting section that limits the input/output of the battery pack based on the estimated maximum internal temperature,
    wherein the maximum temperature estimating section includes:
        inside-outside temperature difference estimating portion that estimates a battery inside-outside temperature difference or a difference between the internal temperature and the surface temperature of the battery pack based on the ambient temperature; and
        internal resistance-dependent temperature difference estimating portion that estimates an internal resistance of each of the unit cells based on the current value and the voltages that are detected at the plurality of any predetermined locations, and thus for estimating an internal resistance-dependent temperature difference or a temperature difference within the battery pack, which is dependent on differences in internal resistance between the unit cells, based on the estimated internal resistance of the each unit cell, and wherein the maximum internal temperature of the battery pack is estimated by adding the sum of the battery inside-outside temperature difference and the internal resistance-dependent temperature difference to a maximum value of the detected surface temperature of the battery pack, the battery inside-outside temperature difference being estimated by the inside-outside temperature difference estimating portion, the internal resistance-dependent temperature difference being estimated by the internal resistance-dependent temperature difference estimating portion.

2. The battery pack input/output control system according to claim 1, further comprising: an inside-outside temperature difference storing section that stores a relationship between the ambient temperature and a predetermined value of the battery inside-outside temperature difference, wherein the inside-outside temperature difference estimating portion estimate the battery inside-outside temperature difference based on the ambient temperature by referring to the relationship stored in the inside-outside temperature difference storing section.

3. The battery pack input/output control system according to claim 1, wherein when a difference between the estimated internal resistance of each of the unit cells and a standard internal resistance is equal to or below a predetermined identifiable threshold, the internal resistance-dependent temperature difference estimating portion use the sum of the standard internal resistance and the internal resistance difference by the amount of the identifiable threshold as the internal resistance of the each unit cell to estimate the internal resistance-dependent temperature difference.

4. The battery pack input/output control system according to claim 1, wherein the maximum temperature estimating section further includes contact state-dependent temperature difference estimating portion that estimates a maximum value of temperature differences between an actual surface temperature of the battery pack and values of the surface temperature, which are detected by the battery temperature sensors, the temperature differences being caused depending on contact states of the plurality of battery temperature sensors with the surface of the battery pack.

5. The battery pack input/output control system according to claim 1, wherein the maximum temperature estimating section further includes sensor-dependent temperature difference estimating portion that estimates a detected temperature error that is dependent on different detection characteristics between the plurality of battery temperature sensors, based on the ambient temperature.

6. The battery pack input/output control system according to claim 1, wherein the input/output limiting section changes an upper limit use temperature, at which the input/output limiting section starts limiting the input/output of the battery pack, depending on a comparison between the estimated maximum internal temperature and a predetermined temperature.

7. The battery pack input/output control system according to claim 1, wherein when the estimated maximum internal temperature is equal to or below the predetermined temperature, the battery pack is prevented from smoking.

8. The battery pack input/output control system according to claim 1, wherein the ambient temperature is a temperature of a medium that is incorporated in the battery pack to cool the battery pack.

* * * * *